Jan. 4, 1955
N. BASHARK
2,698,631
LEVEL CONTROL VALVE
Filed June 3, 1949
2 Sheets-Sheet 1
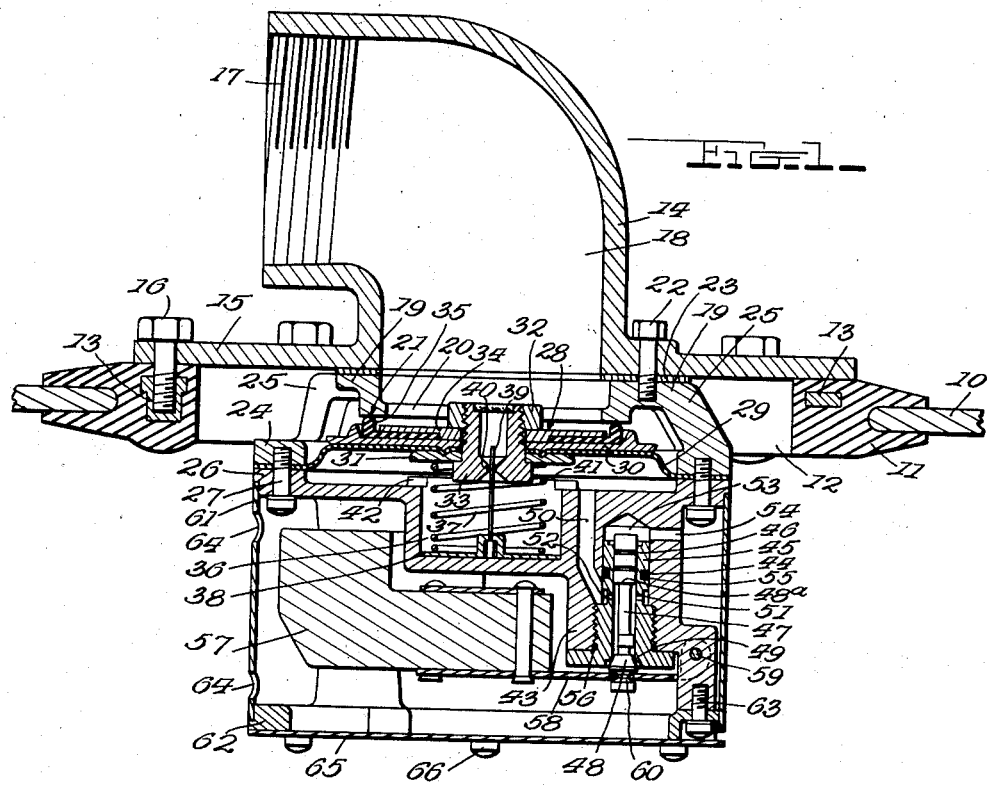
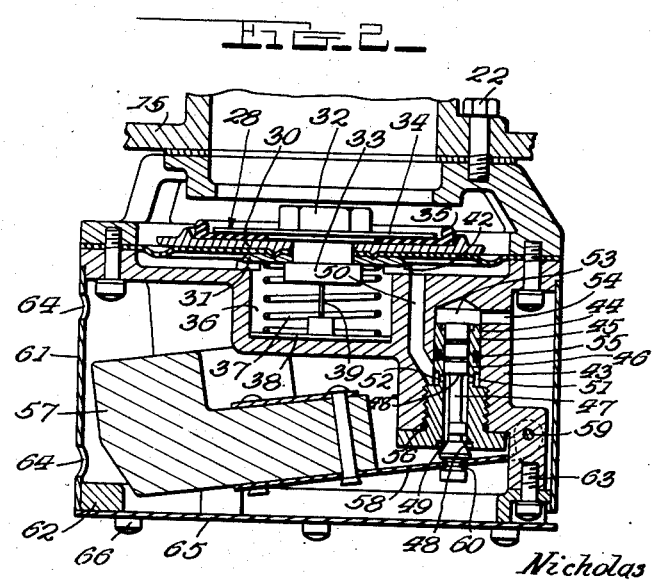
INVENTOR.
Nicholas Bashark.
BY
Mason, Porter, Diller & Stewart
attys.

Jan. 4, 1955
N. BASHARK
2,698,631
LEVEL CONTROL VALVE
Filed June 3, 1949
2 Sheets-Sheet 2
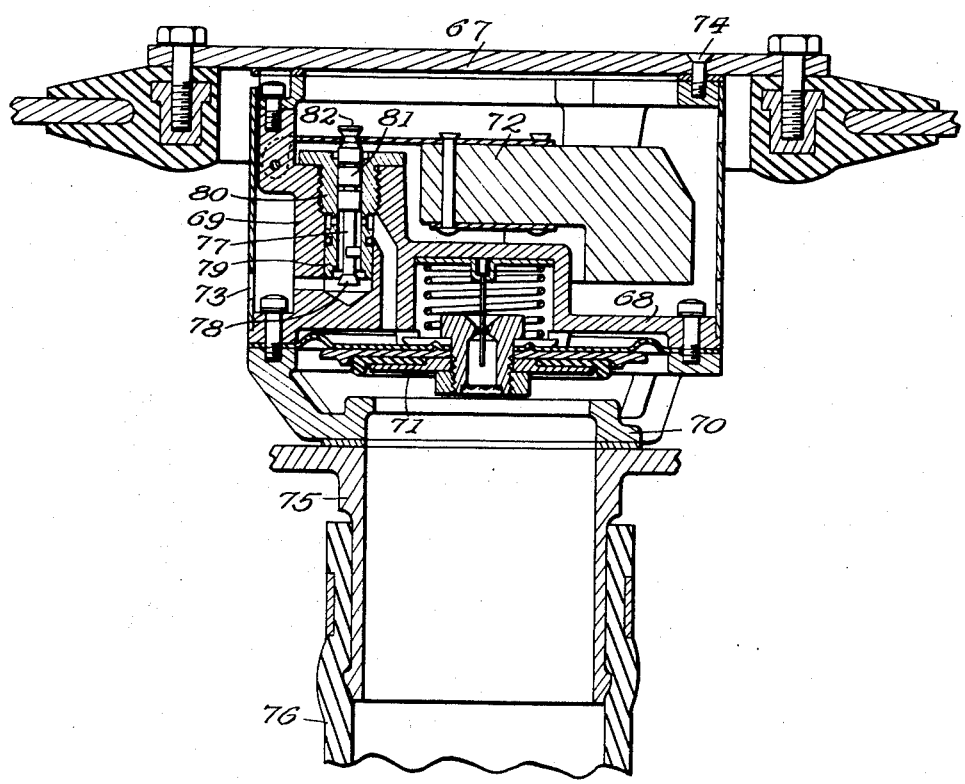
INVENTOR.
Nicholas Bashark.
BY
Mason, Porter, Diller & Stewart
attys.

United States Patent Office 2,698,631
Patented Jan. 4, 1955

2,698,631

LEVEL CONTROL VALVE

Nicholas Bashark, Dayton, Ohio, assignor to The Parker Appliance Company, Cleveland, Ohio, a corporation Application June 3, 1949, Serial No. 97,003

9 Claims. (Cl. 137—414)

The invention relates to float operated valve structures, and more particularly to a valve structure for controlling the level to which a tank may be filled and wherein is included a main fluid pressure operated value which is controlled by a float operated pilot valve.

The present invention has been particularly developed for use in aircraft fuel systems in connection with the filling of tanks directly from a ground supply source, or in connection with the transfer of fuel from one tank to another, the valve serving to shut off incoming fluid when the fluid within the tank reaches a predetermined level. In such installations it is desirable to use a relatively large inlet opening to each tank and to supply the fluid under a pressure which may be as high as 50 p. s i. in order to fill the tanks rapidly. At the same time it is desirable that the level to which each tank is filled shall be accurately held. Since fluid enters the tank at a high rate of flow, it is necessary to have the valve close rapidly and positively when the predetermined fluid level is reached because any delay or variation in the valve closing movement will allow a relatively large amount of fluid to enter the tank and bring about undesirable variations in the level at which final shutoff is obtained.

Level control valve structures having fluid pressure operated main valves controlled by pilot valves are known, but heretofore such structures utilized unbalanced pilot valves. It has been found that previous structures using unbalanced pilot valves vary in their operation, particularly when there is variation in the pressure of the incoming fluid, so that the main valve will not consistently open or close at the same level of fluid within the tank.

Therefore, a principal object of the present invention is to provide a valve structure which will be highly sensitive to variations in the level of fluid within a tank and effective for opening and closing the inlet to the tank rapidly and positively regardless of variations in the pressure of the incoming fluid. This objective is attained through the use, in combination with a fluid pressure operated main valve, of a pilot valve which is statically balanced against fluid pressures, or in other words in pressure balance when closed, and which is capable of effecting its main valve control with very limited movement and with the attendant passage therethrough of a very limited amount of fluid.

Another object of the invention is to provide a level control valve structure of the type referred to in which the main valve has a relatively large flow capacity and is controlled by a pilot valve so balanced and arranged as to be substantially unaffected by variations in the pressure of incoming fluid.

Another object of the invention is to provide a level control valve structure of the type referred to in which special provision is made to assure unrestricted flow through the pilot valve controlled by-pass passage when the main valve is open, as well as through the main filling passage past the main valve, thereby to maintain a proper relief of pressure beneath the main valve diaphragm and assure against the building up of pressure which would tend to close the main valve.

Another object of the invention is to provide a valve structure of the type described in which a cleaning pin is provided for preventing obstruction of the bleed passage by foreign matter in the fluid, and in which the cleaning pin provides the sole guide for the main valve, and is centered so as to avoid provision of an off center fulcruming point or contact which would tend to cause tilting of said main valve.

Another object of the invention is to provide a level control valve structure of the character stated in which the pilot valve is float actuated and so balanced and arranged as to avoid presentation of any pressure area acted upon by pressure in a manner for constituting a variant to float action, thereby assuring that the float shall constitute the sole control factor and permitting the use of a smaller float and a smaller pilot valve than would otherwise be possible.

Another object of the invention is to provide an improved valve structure of the character stated which is adaptable for efficient use either uprightly or in inverted position, the functioning of the parts being the same in each instance and it being necessary only to substitute a silghtly different form of shiftable pilot valve element.

Other objects and advantages of the invention will become apparent from the following detailed description.

In the drawings:

Figure 1 is a vertical section through the valve and showing the valve in closed position.

Figure 2 is a partially fragmentary vertical section showing the valve in open position as when filling the tank.

Figure 3 is a view similar to Figure 1 illustrating the valve structure inverted and mounted so as to provide for bottom filling rather than top filling as in said Figure 1.

In the drawings, 10 indicates the top wall of a rubber type fuel tank such as are used in aircraft and which has vulcanized thereto a rubber adapter 11 equipped with an opening 12 and having embedded therein a metallic bolt ring 13. The valve structure is mounted in the opening 12 and includes an inlet fitting 14 having a flange 15 for attachment to the bolt ring 13 by means of suitable screws 16. The inlet fitting 14 has a suitable internally threaded inlet 17 to which a fluid supply conduit may be attached. The opening 12 in the tank adapter 11 is closed by the inlet fitting flange 15. In register with the outlet bore 18 in the inlet fitting 14 there is provided a main valve seat member 19 having an opening 20 surrounded by a flat annular seat face 21. The seat member 19 is attached to the inlet fitting by suitable screws 22, and a gasket 23 is interposed between said seat member and the flange 15. Spaced outwardly with relation to the seat face 21 is an annular clamping ring 24 which is integrally connected with the seat member 19 by circumferentially spaced ribs 25.

A housing member 26 is attached to the ring 24 by screws 27 and forms therewith a valve chamber for housing a fluid pressure actuated main valve generally designated 28. The main valve 28 is attached to a diaphragm 29, being clamped between the plates 30 and 31 by the nut 32 and the orifice bolt 33 and the interposed clamp plate 34. The outer margin of the diaphragm is clamped between the ring 24 and the housing 26 and divides the valve chamber into upper and lower sections. The main valve generally designated 28 includes a seating ring 35 formed of rubber or comparable yieldable material and adapted to cooperate with the seat face 21 in controlling the passage of fluid into the tank. This seating ring 35 is held in place by the previously mentioned clamp plate 34.

The housing member 26 has a recess or depression 36 in which is mounted a spring 37 for biasing the main valve to its closed position shown in Figure 1. Mounted in the recess and held in position by a retainer plate 38 is a cleaning pin 39. This pin extends upwardly through a restricted passage or orifice 40 in the orifice bolt 33. This pin serves to prevent clogging of the passage 40 by any foreign solid matter which may be contained in the incoming fluid, and also provides the sole guide means for the main valve 28. The retainer 38 is held in position at the bottom of the recess 36 by the spring 37.

Surrounding the entrance to the recess 36 is an upraised rim 41 having slots 42. The rim serves as a stop for the opening travel of the main valve and prevents the diaphragm from seating directly on the upper face of the housing member 26. The slots 42 direct incoming fluid from the recess 36 to the underside of the diaphragm, and thence to the by-pass passage which is formed in the depending enlargement 43 formed on the housing member 26. The slots 42 are so formed that they cannot be closed off by the opening of the main valve, thus assuring against obstruction of fluid flow into the chamber beneath the diaphragm and also of by-pass fluid to the pilot valve to be described in detail hereinafter.

The enlargement 43 of the housing member 26 is formed at one side thereof, a bore 44 extending upwardly from its lower end. Mounted in said bore is a valve bushing 45 having a valve bore 46 in which a pilot valve 47 is vertically-reciprocally mounted. The pilot valve 47 is of the statically balanced type, having a seating face 48 which engages a sharp edge valve seat 49 at the lower end of the bore 46. The valve has an enlarged extension 48a at its upper end, said extension being of the same diameter as the sharp edge valve seat 49 whereby equal areas are exposed to fluid under pressure within the valve bore 46.

The housing enlargement 43 has a by-pass passage 50 connecting the lower section of the main valve chamber with the bore 44 at a point opposite an annular groove 51 in the bushing 45. Radially drilled holes 52 connect the groove 51 with the valve bore 46. The upper end of the bushing 45 terminates short of the bottom of the bore 44 so as to provide a chamber 53. A drilled passage 54 connects the chamber 53 with the space surrounding the housing member 26. Sealing gaskets 55 and 56 prevent leakage past the outer diameter of the bushing 45 on either side of the annular groove 51.

A float 57 of cork or other suitable material is mounted on an arm 58 which is pivotally mounted as at 59 at the lower end of the housing enlargement 43. The float arm 58 is loosely coupled as at 60 with the pilot valve 47, the connection being in the form of cooperating or interengaging grooves which permit freedom of pivotal movement for the arm without objectionable free movement of the pilot valve.

A thin metal shell 61 surrounds the float and the housing member 26 and is supported by an annular ring 62 which is attached to the housing member 26 by means of suitable screws 63. Circumferentially spaced holes 62 communicate between the interior of the shell 59 or the space surrounding the housing 26 and the interior of the tank, and a bottom plate 65 secured to the ring 62 by screws 66 protects the float against direct contact by sloshing fluid within the tank.

When the tank is being filled, incoming fluid continues to flow through the valve structure until the tank is filled to a predetermined level. The main valve then automatically closes to prevent additional fluid from entering the tank. After such filling and when the tank is empty or partially empty, the main valve 28 is normally held against its seat 21 by the action of the spring 37 as shown in Figure 1, and the pilot valve 47 will be held open by the weight of the float 57 as shown in Fig. 2.

During each filling of the tank, the pressure of the incoming fluid will move the main valve 28 to the open position as shown in Figure 2. Fluid will then flow past the main valve seat 21 through the openings between the ribs 25 and into the interior of the tank. Meanwhile a small amount of fluid will be by-passed through the restricted orifice 40 into the recess 36, through the slots 42, the passages 50, 51 and 52 into the pilot valve bore 46 and out past the valve seat 49 into the interior of the tank through the shell opening 64. See Figure 2. All of the by-pass passages between the lower side of the diaphragm 29 and the interior of the tank are larger than the orifice 40 so that fluid can pass therethrough faster than it can pass through said orifice. This results in a lower pressure being applied to the underside of the diaphragm 29 than to the upper side, and consequently the main valve 28 is held open by fluid pressure.

When the fluid within the tank reaches the predetermined level the float 57 will rise so as to close the pilot valve 47, or in other words move the same to the Figure 1 position, and thus cut off the by-pass flow through the seat 49. Upon the closing of the valve 47, the pressure of the fluid on opposite sides of the diaphragm 29 will promptly become equalized and the main valve 28 will be moved to the closed position by the action of the spring 37. When the main valve 28 has reached its closed position, the incoming fluid acts across the upper surface of the valve on an area determined by the diameter within the effective annulus of the seating ring 35. At the same time the fluid which is trapped in the chamber section below the diaphragm acts on the valve 28 over an area which is larger than the area of the upper plate 30, and since this area is larger than the area bounded by the seating ring 35, the pressure acting upwardly beneath the diaphragm will be effective for keeping the main valve closed.

When the liquid in the tank drops below the predetermined level, the float 57 drops downward by gravity and opens the pilot valve 47 as illustrated in Figure 2. This opens the by-pass passages 50, 51, 52 and 46 to permit the main valve 28 to again be opened by incoming fluid pressure as previously described.

As before stated, the pilot valve 47 is of the balanced type, and fluid pressure acting against the same within the bore 46 in a direction tending to open the valve, namely the exposed portions of the seating face 48, is counteracted or resisted by pressure acting against the valve end portion 48a and tending to close said valve. The construction and arrangement of parts herein described also permits the use of a very small, light weight pilot valve which will avoid problems of material gravity action. With this arrangement no substantial force will be required to be transmitted to the pilot valve for holding it in either open or closed position. The pilot valve 47 is moved to and held in open position by the weight of the float, and is moved to and held in the closed position by the buoyant force developed when the float is immersed in the liquid within the tank. The buoyant force is of course, dependent upon the volume and specific gravity of the float. Since a minimum of force is required to hold the pilot valve in either of its positions, both the weight and the volume of the float may be held to a minimum. It will be readily appreciated that these are vital considerations in all articles designed for use in aircraft.

From the foregoing description it is apparent that a relatively large main valve is provided which can permit a large amount of fluid to rapidly enter the tank and that this large valve is controlled by means of a relatively small pilot valve. Since the pilot valve is statically balanced, variation in the pressure and flow rate of the incoming fluid does not effect operation of the pilot valve and hence does not effect the closing of the main valve. Since these variations do not effect the closing of the main valve, they therefore also do not substantially affect the level of the fluid within the tank at which closing occurs, with the result that a highly sensitive valve is provided.

In Figure 3 there is illustrated a modified arrangement of the valve structure in which the filling of the tank is accomplished through the bottom, or upwardly, instead of downwardly as in Figure 1. This illustration brings to light an important feature of the invention, namely the adaptability of the valve structure to efficient use either uprightly or in inverted position, the functioning of the parts being approximately the same in each instance, and it being necessary only to substitute a slightly different form of shiftable pilot valve element.

In this modified arrangement a closure plate 67 is removably secured over the tank opening instead of the previously described inlet fitting. The assembly comprising the housing structure 68 and its pilot valve mounting enlargement 69, the attached seat member 70, main valve 71, float 72 and the shell 73 are identical in form except for the inversion of this whole assembly in mounting. In this arrangement the assembly is suspended by the screws 74 from the closure plate 67, and to the seat member 70 is secured an inlet fitting 75 through which the fluid is delivered from the connected bottom feed duct 76. The only part of the basic assembly which is changed in this bottom feed arrangement is the pilot valve element 77.

It will be noted that the pilot valve 77 is of substantially the same size and of the same general shape as in the first described form, and in like manner is statically balanced, or in other words is so constructed that equal pressures tend to to both seat and unseat the same when it is in the closed position. The flared seating face 78 now engages in line contact with the seat 79 at the inner, or now lower end of the valve bushing 80, such a seat being provided at each end of said bushing as before. The end portion beyond the flared seating face is cut off abruptly because no extension is necessary for connection with the float, and now the enlarged end 81 of the valve element is extended at 82 to provide the desired loose couple with the float. Despite the inversion of the float, upward movement or buoyant action of the float 72 serves to close off the by-passing of fluid effective to provide for opening of the main valve 71 as before, and downward movement of the float resulting from the lowering of the fluid level in the tank provides for an opening of said main valve and the introduction of fluid into the tank as in the previously described form. This modified valve arrangement is as highly sensitive as the first described form and is not objectionably influenced by variations in pressure and flow rate of the incoming fluid.

While alternative example forms of the invention are shown and described herein, it is to be understood that various other modifications in construction and arrangement of parts may be made without departing from the spirit and scope of the invention as defined in the appended claims.

What I claim is:

1. In a valve structure for controlling the level of fluid in a tank, the combination of a valve body having a main seat and a main passage therethrough for the introduction of fluid into the tank, a main valve cooperative with said main seat for controlling fluid flow through said main passage, a first by-pass passage through which the fluid may pass from one side of the main valve to the other and a second by-pass passage in constant communication with said first by-pass passage and through which by-passing fluid may flow away from the side of said main valve away from its seat to relieve pressure and permit said main valve to open, a pilot valve operable in said second by-pass passage in position for being effective in a closed position to prevent pressure relieving passage of fluid through said second by-pass passage and in an open position to permit such pressure relieving fluid passage, said pilot valve being slidable longitudinally in a cylindrical bore into which the second by-pass enters immediately of the ends of the bore so that the bore forms a continuation of the second by-pass, said pilot valve having annular surface portions of like area disposed at opposite sides of said by-pass bore entry in all positions of the pilot valve and acted against in opposite endwise directions by fluid in said bore so as to be balanced against static fluid pressure within said second by-pass passage when in closed position, and a float connected with said pilot valve and responsive to fluid level in the tank for shifting the pilot valve to its closed and open positions accordingly as the fluid in the tank reaches its predetermined level or falls below said level.

2. In a valve structure for controlling the level of fluid in a tank, the combination of a valve body having a valve chamber and an inlet and an outlet communicating with said chamber, a flexible diaphragm dividing said chamber into upper and lower sections and separating one said section from said inlet and outlet, a main valve movable with the diaphragm for controlling communication between said inlet and outlet, a recess forming an enlargement of said separated chamber, an annular abutment means completely surrounding said recess and having a plurality of radial openings therethrough, said recess being constantly in free open communication with said lower chamber section in part through said radial openings, spring means in said recess and constantly tending to move the diaphragm in a direction for closing communication between said inlet and outlet, means on said diaphragm for engaging the abutment means about the whole compass of the main valve for limiting the movement of said main valve in a direction for opening communication between the inlet and the outlet, a by-pass passage through which fluid may pass from one side of the main valve to the other and from said separated chamber section to relieve pressure and permit movement of the main valve to said open position, said by-pass passage including said recess to relieve pressure and permit movement of the main valve to said open position, said by-pass passage including a restricted passage through the central part of the main valve and leading into said recess and also said radial openings through said abutment means, a pilot valve effective in a closed position to prevent pressure relieving passage of fluid through said by-pass passage and in an open position to permit such pressure relieving fluid passage, and a float connected with said pilot valve and responsive to fluid level in the tank for shifting the pilot valve to its closed and open positions accordingly as the fluid in the tank reaches its predetermined level or falls below said level.

3. In a valve structure for controlling the level of fluid in a tank, the combination of a valve body having a main seat and a main passage therethrough for the introduction of fluid into the tank, a main valve cooperative with said seat for controlling fluid flow through said passage and including a flexible portion permitting a measure of lateral movement as well as movement toward and from said seat, a by-pass passage through which fluid may pass from one side of the main valve to the other and from the side of said main valve away from its seat to relieve pressure and permit said main valve to open, a balanced pilot valve effective in a closed position to prevent pressure relieving passage of fluid through said by-pass passage and in an open position to permit such pressure relieving fluid passage, said main valve having a central guide aperture therein forming a part of said by-pass passage, a guide pin mounted in the valve body and projecting as an anti-clogging device through the central aperture in the main valve, and also engageable as a valve movement guide in said aperture, and a float connected with said pilot valve and responsive to fluid level in the tank for shifting the pilot valve to its closed and open positions accordingly as the fluid in the tank reaches its predetermined level or falls below said level, and said pin serving to so restrict said aperture through the central part of the main valve that fluid will pass therethrough less rapidly than it can flow out through the by-pass passage when the pilot valve is open.

4. In a valve structure for controlling the level of fluid in a tank, the combination of a valve body having a valve chamber and an inlet and an outlet communicating with said chamber, a flexible diaphragm dividing said chamber into upper and lower sections and separating one said section from said inlet and outlet, a main valve movable with the diaphragm for controlling communication between said linet and outlet, said valve body also having a recess forming an enlargement of said separated chamber, an annular abutment means completely surrounding said recess and having a plurality of radial openings therethrough, said recess being constantly in free open comunication with said lower chamber section in part through said radial openings, spring means in said recess and constantly tending to move the diaphragm in a direction for closing communication between said inlet and outlet, means on said diaphragm for engaging the abutment means for limiting the movement of the main valve in a direction for opening communication between the inlet and the outlet, a by-pass passage through which fluid may pass from one side of the main valve to the other and from said separated chamber section to relieve pressure and permit movement of the main valve to said open position, said by-pass passage including a restricted passage through the central part of the main valve and leading into said recess and also said passage through said abutment means, a pilot valve effective in a closed position to prevent pressure relieving passage of fluid through said by-pass passage and in an open position to permit such pressure relieving fluid passage, a guide pin mounted in said recess and projecting as a guide and a foreign solid matter removing means into and through said restricted passage, and a float connected with said pilot valve and responsive to fluid level in the tank for shifting the pilot valve to its closed and open positions accordingly as the fluid in the tank reaches its predetermined level or falls below said level and said pin serving to so restrict said passage through the central part of the main valve that fluid will pass therethrough less rapidly than it can flow out through the by-pass passage when the pilot valve is open.

5. In a valve structure for controlling the level of fluid in a tank, the combination of a valve body having a valve chamber and an inlet and an outlet communicating with said chamber, a flexible diaphragm dividing said chamber into upper and lower sections and separating one said section from said inlet and outlet, a main valve movable with the diaphragm for controlling communication between said inlet and outlet, said valve body also having a recess forming an enlargement of said separated chamber, an abutment means completely surrounding said recess and having a plurality of radial openings therethrough, said recess being constantly in free open communication with said lower chamber section in part through said radial openings, spring means in said recess and constantly tending to move the diaphragm in a direction for closing communication between said inlet and outlet, means on said diaphragm for engaging the abutment means for limiting the movement of the main valve in a direction for opening communication between the inlet and the outlet, a by-pass passage through which fluid may pass from one side of the main valve to the other and from said separated chamber section to relieve pressure and permit movement of the main valve to said open position, said by-pass passage including a restricted passage through the central part of the main valve and leading into said recess and also said radial openings through said abutment means, a pilot valve effective in a closed position to prevent pressure relieving passage of fluid through said by-pass passage and in an open position to permit such pressure relieving fluid passage, a guide pin mounted in said recess and projecting as a guide and a foreign solid matter removing means into said restricted passage, and a float connected with and through said pilot valve and responsive to fluid level in the tank for shifting the pilot valve to its closed and open positions accordingly as the fluid in the tank reaches its predetermined level or falls below said level and said pin serving to so restrict said passage through the central part of the main valve that fluid will pass therethrough less rapidly than it can flow out through the by-pass passage when the pilot valve is open, said pin being mounted on a cap seated at the bottom of said recess, and said spring also serving to hold the cap and pin in position in said recess.

6. In a valve structure for controlling the level of fluid in a tank, the combination of a valve body having a main seat and a main passage therethrough for the introduction of fluid into the tank, a main valve cooperative with said main seat for controlling fluid flow through said main passage, a first by-pass passage through which fluid may pass from one side of the main valve to the other and a second by-pass passage in constant communication with said first by-pass passage and through which by-passing fluid may flow away from the side of said main valve away from its seat to relieve pressure and permit said main valve to open, said body also having a cylindrical bore, a bushing mounted in the bore sealed with respect to the wall of the bore at spaced points and having a cylindrical pilot valve bore extending through its axis and communicating with the second by-pass passage intermediate said spaced points, means providing a passageway extending away from the pilot valve bore at each end thereof and communicating with the interior of the tank, a pilot valve slidable longitudinally in the pilot valve bore and effective in a closed position to prevent pressure relieving passage of fluid through said second by-pass passage and in open position to permit such pressure relieving fluid passage, said pilot valve having annular surface portions of like area acted against in opposite endwise directions by fluid entering the pilot valve bore through said intermediately placed by-pass opening into the pilot valve bore so as to be balanced against fluid pressure in the pilot valve bore when closed, and a float connected with said pilot valve and responsive to fluid level in the tank for shifting the pilot valve to its closed and open positions accordingly as the fluid in the tank reaches its predetermined level or falls below said level.

7. In a valve structure for controlling the level of fluid in a tank, the combination of a valve body having a main seat and a main passage therethrough for the introduction of fluid into the tank, a main valve cooperative with said seat for controlling fluid flow through said passage, a by-pass passage through which fluid may pass from one side of the main valve to the other and from the side of said main valve away from its seat to relieve pressure and permit said main valve to open, said valve body being mountable uprightly or in inverted position to receive fluid in a downward or upward direction respectively through said main seat and having a pilot valve bore therein uprightly disposed and communicating with the by-pass passage intermediately of the upper and lower ends of said valve bore and having a valve seat at each of its said upper and lower ends, means providing a passageway extending away from each said pilot valve bore seat and communicating with the interior of the tank so as to be capable of discharging by-passing fluid into the tank through one pilot bore seat when the valve body is uprightly mounted and through the other pilot bore seat when the valve body is mounted in inverted position, one said pilot valve bore seat being placed to cooperate with a selected pilot valve to control passage of fluid through the by-pass when the valve body is uprightly mounted, and the other of said pilot valve bore seats being placed to cooperate with a selected pilot valve to control passage of fluid through the by-pass when the valve body is mounted in inverted position, and a float supported on the valve body and responsive to fluid level in the tank in either the upright or inverted mounting of the valve body and having means for connection with a selected pilot valve when mounted in the pilot valve bore for shifting the same between closed and open positions accordingly as the fluid in the tank reaches its predetermined level or falls below said level.

8. In a valve structure for controlling the level of fluid in a tank, the combination of a valve body having a main seat and a main passage therethrough for the introduction of fluid into the tank, a main valve cooperative with said main seat for controlling fluid flow through said main passage, a by-pass passage through which fluid may pass from one side of the main valve to the other and from the side of said main valve away from its seat to relieve pressure and permit said main valve to open, said body also having an upright pilot valve bore therein communicating intermediate its upper and lower ends with the by-pass passage and having at each of its upper and lower ends an identical seat, there also being included endwise of each said upper and lower pilot bore seat passage means providing communication between the respective seat and the interior of the tank, said body being mountable uprightly or in inverted position to receive fluid in a downward or upward direction respectively through said main seat and for presenting one or the other of the pilot valve bore seats downwardly as an effective by-pass fluid outlet, a pilot valve slidable in the pilot valve bore, said pilot valve having a seating head engageable with the downwardly directed pilot valve bore seat to close the by-pass and prevent pressure relieving passage of fluid from the valve bore and movable away from said downwardly directed bore seat to open the by-pass and permit such pressure relieving fluid passage, and a float supported by the valve body and responsive to fluid level in the tank in either the upright or inverted mounting of the valve body and having connection with the pilot valve for shifting the same between its closed and open positions accordingly as the fluid in the tank reaches its predetermined level or falls below said level.

9. Valve structure as defined in claim 8 wherein is included a threadedly mounted bushing in which the pilot valve bore is formed and wherein the pilot valve includes annular surface portions of like area acted against in opposite endwise directions by fluid entering the pilot valve bore through the intermediately placed by-pass opening into the pilot valve bore so as to be balanced against fluid pressure in the pilot valve bore when closed.

References Cited in the file of this patent

UNITED STATES PATENTS

| 515,703 | Birkery | Feb. 27, 1894 |
| 711,349 | Schlaepfer | Oct. 14, 1902 |
| 968,948 | Hunter | Aug. 30, 1910 |
| 1,005,703 | Goeddel | Oct. 10, 1911 |
| 1,034,826 | Payne | Aug. 6, 1912 |
| 1,521,745 | Becker | Jan. 6, 1925 |
| 1,676,084 | Flagg | July 3, 1928 |
| 2,211,237 | Langdon | Aug. 13, 1940 |
| 2,240,102 | Textor | Apr. 29, 1941 |
| 2,477,186 | Koehler | July 26, 1949 |
| 2,491,521 | Samiran | Dec. 20, 1949 |
| 2,548,368 | Hartley | Apr. 10, 1951 |